US010462706B2

(12) United States Patent
Turtinen et al.

(10) Patent No.: US 10,462,706 B2
(45) Date of Patent: Oct. 29, 2019

(54) USE OF WAIT PERIOD TO OBTAIN ON-DEMAND SYSTEM INFORMATION FOR WIRELESS NETWORKS

(71) Applicant: NOKIA TECHNOLOGIES OY, Espoo (FI)

(72) Inventors: Samuli Turtinen, Ii (FI); Ahmad Awada, München (DE)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 15/632,220

(22) Filed: Jun. 23, 2017

(65) Prior Publication Data

US 2018/0376375 A1 Dec. 27, 2018

(51) Int. Cl.
| | |
|---|---|
| *G06F 15/16* | (2006.01) |
| *H04W 28/18* | (2009.01) |
| *H04N 21/472* | (2011.01) |
| *H04N 21/61* | (2011.01) |
| *H04W 48/14* | (2009.01) |
| *H04L 29/06* | (2006.01) |

(Continued)

(52) U.S. Cl.
CPC ...... *H04W 28/18* (2013.01); *H04N 21/47202* (2013.01); *H04N 21/6106* (2013.01); *H04W 48/14* (2013.01); *H04L 65/4084* (2013.01); *H04M 3/487* (2013.01); *H04W 72/0406* (2013.01)

(58) Field of Classification Search
CPC . H04W 28/18; H04W 48/14; H04W 72/0406; H04N 21/47202; H04N 21/6106; H04L 65/4084
See application file for complete search history.

(56) References Cited

U.S. PATENT DOCUMENTS

| | | | | |
|---|---|---|---|---|
| 7,139,573 | B2 * | 11/2006 | Barrow | H04W 8/245 |
| | | | | 455/435.1 |
| 8,331,933 | B2 * | 12/2012 | Koo | H04W 56/002 |
| | | | | 370/350 |

(Continued)

OTHER PUBLICATIONS

3GPP TR 38.804, V1.0.0, 3rd Generation Partnership Project; Technical Specification Group Radio Access Network; Study on New Radio Access Technology; Radio Interface Protocol Aspects (Release 14), Mar. 2017, 56 pages.

(Continued)

*Primary Examiner* — Moustafa M Meky
(74) *Attorney, Agent, or Firm* — Brake Hughes Bellermann LLP

(57) ABSTRACT

According to an example implementation, a method may include transmitting, by a user device to a base station in a wireless network, a system information request for on-demand system information during a random access procedure, where the system information request is a request for one or more parameters that enable the user device to communicate in the wireless network, receiving, by the user device from the base station, an indication of a wait period in which the user device waits before obtaining the on-demand system information, waiting, by the user device, a time duration during the wait period, and monitoring, by the user device after expiration of the wait period, a system information window in which a system information message having the on-demand system information is broadcasted by the base station.

32 Claims, 9 Drawing Sheets

(51) Int. Cl.
    *H04M 3/487*     (2006.01)
    *H04W 72/04*     (2009.01)

(56) References Cited

U.S. PATENT DOCUMENTS

| | | | |
|---|---|---|---|
| 8,588,098 B2* | 11/2013 | Ito | H04L 27/2613 |
| | | | 370/252 |
| 9,049,728 B2 | 6/2015 | Park et al. | |
| 9,648,498 B2* | 5/2017 | Cho | H04W 48/06 |
| 9,730,237 B1* | 8/2017 | Lee | H04W 74/0833 |
| 2007/0015505 A1* | 1/2007 | Barrow | H04W 8/245 |
| | | | 455/432.2 |
| 2007/0032255 A1* | 2/2007 | Koo | H04W 56/002 |
| | | | 455/512 |
| 2007/0237109 A1* | 10/2007 | Iida | H04L 1/188 |
| | | | 370/328 |
| 2009/0147761 A1* | 6/2009 | Adachi | H01Q 1/246 |
| | | | 370/338 |
| 2011/0222429 A1* | 9/2011 | Ito | H04L 27/2613 |
| | | | 370/252 |
| 2013/0225219 A1* | 8/2013 | Hsu | H04W 88/08 |
| | | | 455/509 |
| 2016/0135145 A1 | 5/2016 | Tirronen et al. | |
| 2018/0020428 A1* | 1/2018 | Madhavan | H04W 8/22 |

OTHER PUBLICATIONS

Acquiring LTE System Information MATLAB & Simulink, Jun. 22, 2017, 3 pages (https://www.mathworks.com/company/newsletters/articles/acquiringltesysteminformation.html).

All About Wired and Wireless Technology, Apr. 2013, 9 pages (http://www.simpletechpost.com/2013/04/randomaccessprocedurerachinlte.html).

Long Term Evolution (4GLTE): LTE Random Access Procedure (RACH), Jun. 2014, 3 pages (http://themobilecommunication.blogspot.com/2014/06/lterandomaccessprocedurerach.html).

LTE Random Access Procedure, 5 pages.

LTE System Information Blocks-MIB,S1B1,2,3,4,5,6,7,8,9,10,11, RF Wireless World, Jun. 22, 2017, 5 pages (http://www.rfwirelessworld.com/Terminology/LTEMIBSIBsysteminformationblocks.html).

LTE System Information: Part 1—Hongyan—Expert Opinion—LTE University, Aug. 9, 2010, 2 pages (http://lteuniversity.com/get_trained/expert_opinion1/b/hongyanlei/archive/2010/08/09/ltesysteminformationpart1.aspx).

RACH: Share Technote, Jun. 22, 2017, 40 pages (http://www.sharetechnote.com/html/RACH_LTE.html).

Telecom News: Backoff Indicator in RACH Processing, Jun. 2011, p. 2 (https://bandarupallivenu.blogspot.com/2011/06/backoffindicatorinrachprocessing.html).

The Random Access Procedure—LTE Knowledge, Nov. 2015 (http://www.ltehandbooks.com/2015/11/therandomaccessprocedure.html).

* cited by examiner

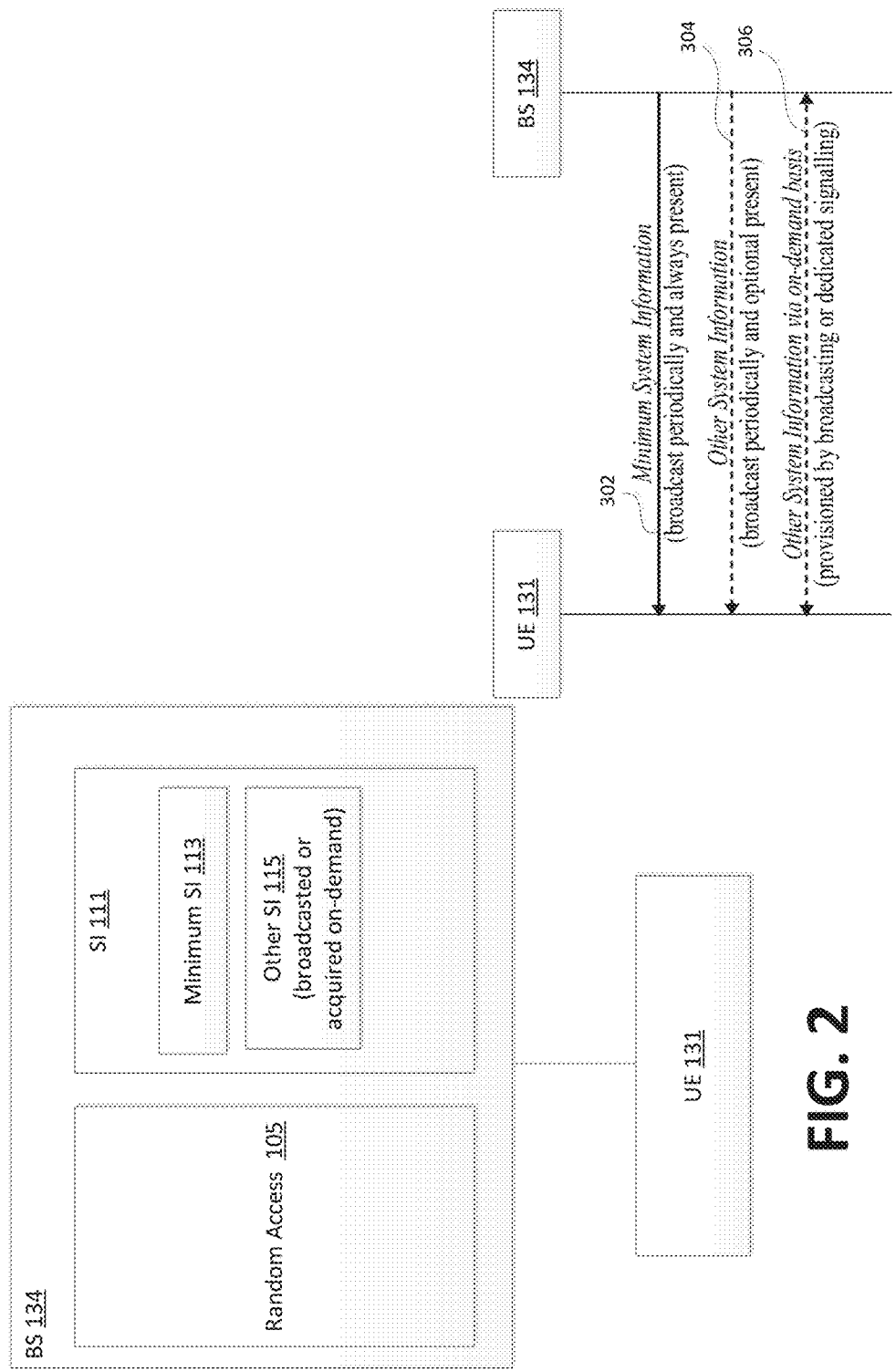

USE OF WAIT PERIOD TO OBTAIN ON-DEMAND SYSTEM INFORMATION FOR WIRELESS NETWORKS

TECHNICAL FIELD

This description relates to communications, and in particular, to use of a wait period to obtain on-demand system information for wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. 5G (or 5$^{th}$ generation) wireless networks are also being developed.

In LTE, the system may include an on-demand system information (SI) delivery mechanism in which on-demand SI is transmitted to UEs. For instance, when an UE is attempting to access the network, the UE can request on-demand SI during a random access procedure. The UE receives an acknowledgment from the base station in response to the on-demand SI. Then, the base station transmits an SI message to the UE during an SI window that contains one or more parameters in the form of one or more blocks to enable the UE to communicate in the wireless network. However, the base station is not mandated to transmit SI messages when requested. For instance, the base station may be facing a congestion in the downlink channel or other transmissions are given priority over requested SI messages, and the base station may not be able to promptly transmit an SI message to the requesting UE within the next one or more SI windows. In such situations, the UE may re-attempt the SI request, which may load the random access channel (RACH) since the base station will not provide the requested SI before a certain time.

In LTE, a backoff indicator field can be signaled by the network as part of a media access control (MAC) sub-header in a random-access channel (RACH) response. With respect to a value of the backoff indicator, the UE may select a random backoff time according to a uniform distribution between 0 and the backoff parameter corresponding to the signaled backoff indicator. The backoff time is applied only if the random access response (RAR) reception is considered not successful, which occurs if none of the received RARs contain a Random Access Preamble identifier (RAPID) corresponding to the transmitted RA preamble. As such, this backoff indicator cannot be applied by the UEs that have successfully received a RAR. In this case, the UEs that have received an ACK in the RAR will attempt to decode the SI message in the next SI window, and if the SI message is not delivered, the UEs will re-send new SI requests, which may cause congestion on the network.

SUMMARY

According to an example implementation, a method may include transmitting, by a user device to a base station in a wireless network, a system information request for on-demand system information during a random access procedure, where the system information request is a request for one or more parameters that enable the user device to communicate in the wireless network, receiving, by the user device from the base station, an indication of a wait period in which the user device waits before obtaining the on-demand system information, waiting, by the user device, a time duration during the wait period, and monitoring, by the user device after expiration of the wait period, a system information window in which a system information message having the on-demand system information is broadcasted by the base station.

In some example implementations, the method may include any one or more of the following features (or any combination thereof). The system information request may be included within a random access preamble message. The method may further include transmitting, by the user device to the base station, a random access preamble message, receiving, by the user device from the base station, a random access response, and transmitting, by the user device from the base station, a message in response to the random access response, the message including the system information request. The indication of the wait period may be included with an acknowledgment message in response to the system information request. The method may include re-transmitting the system information request after the wait period. The indication of the wait period may include an index value, and the user device may be configured to obtain the time duration for the wait period from a wait time table using the index value. The method may further include comparing the time duration of the wait period to a threshold level, and transmitting, from the user device to a different base station in a different cell, a new system information request in response to the time duration of the wait period being above the threshold level. The time duration may be included in the indication of the wait period, where the time duration is expressed in a unit of time or as a function of system information periodicities.

According to an example implementation, an apparatus comprises at least one processor and at least one memory including computer instructions, when executed by the at least one processor, cause the apparatus to transmit, by a user device to a base station in a wireless network, a system information request for on-demand system information during a random access procedure, where the system information request is a request for one or more parameters that enable the user device to communicate in the wireless network, receive, by the user device from the base station, an indication of a wait period in which the user device waits before obtaining the on-demand system information, wait, by the user device, a time duration during the wait period, and monitor, by the user device after expiration of the wait period, a system information window in which a system information message having the on-demand system information is broadcasted by the base station.

In some example implementations, the apparatus may include any one or more of the above and/or below features (or any combination thereof). The indication of the wait period may correspond to a plurality of SI messages such that the plurality of SI messages are delayed by the time duration of the wait period. The computer instructions, when executed by the at least one processor, may cause the apparatus to transmit, by the user device to the base station, a random access preamble message, receive, by the user device from the base station, a random access response, and transmit, by the user device from the base station, a message in response to the random access response, the message including the system information request. The indication of the wait period may be included with an acknowledgment message in response to the system information request. The computer instructions, when executed by the at least one processor, may cause the apparatus to re-transmitting the system information request after the wait period. The indication of the wait period may include a bit indicating the user device to wait, and the time duration of the wait period is indicated by minimum system information broadcasted by the base station. The computer instructions, when executed by the at least one processor, may cause the apparatus to compare the time duration of the wait period to a threshold level, and transmit, by the user device to a different base station in a different cell, a new system information request in response to the time duration of the wait period being above the threshold level. The indication of the wait period may be included within minimum system information broadcasted by the base station, and the user device may wait the time duration of the wait period before transmitting the system information request to the base station. The indication of the wait period may be included within a random access channel (RACH) response.

According to an example implementation, a computer program product having a computer-readable storage medium and storing executable code that, when executed by at least one processor, is configured to cause the at least one processor to receive, by a base station from a user device in a wireless network, a system information request for on-demand system information during a random access procedure, where the system information request is a request for one or more parameters that enable the user device to communicate in the wireless network, determine, by a base station, a delay condition for transmitting system information messages to one or more user devices, transmit, by the base station to the user device, an indication of a wait period in which the base station waits before broadcasting a system information message having the on-demand system information in response to the determination of the delay condition, and broadcast, by the base station to the user device, the system information message during a system information window after the wait period.

In some example implementations, the computer program product may include any one or more of the above and/or below features (or any combination thereof). The system information request may be included within a random access preamble message, and the indication of the wait period may be included within an acknowledgment of the random access preamble message. The executable code that, when executed by the at least one processor, is configured to cause the at least one processor to receive, by the base station from the user device, a random access preamble message, transmit, by the base station to the user device, a random access response, and receive, by the base station from the user device, a message in response to the random access response, where the message may include the system information request, and the indication of the wait period may be included within an acknowledgement of the message. The executable code, when executed by the at least one processor, is configured to cause the at least one processor to periodically broadcast, by the base station, minimum system information during a system information window, where the minimum system information may include the indication of the wait period.

According to an example implementation, a method includes transmitting, by a user device to a base station in a wireless network, a system information request for on-demand system information during a random access procedure, where the system information request is a request for one or more parameters that enable the user device to communicate in the wireless network, receiving, by the user device from the base station, an indication of a wait period in which the user device waits before obtaining the on-demand system information, and waiting, by the user device, during the wait period in which the user device can expect to receive the on-demand system information.

According to example implementations, the method may include one or more of the above/below features (or any combination thereof). The method may include retransmitting, by the user device to the base station after the wait period, the system information request during the random access procedure. The system information request may be included within a random access preamble message. The method may further include transmitting, by the user device to the base station, a random access preamble message, receiving, by the user device from the base station, a random access response, and transmitting, by the user device to the base station, a message in response to the random access response, where the message includes the system information request. The indication of the wait period may be included with an acknowledgment message in response to the system information request. The indication of the wait period may be included within minimum system information broadcasted by the base station. The indication of the wait period may be included within a random access channel (RACH) response. The indication of the wait period may include an index value, and the user device may be configured to obtain the time duration for the wait period from a wait time table using the index value. The indication of the wait period may include a time duration expressed as a function of system information periodicities. The method may further include considering, by the user device, a cell of the wireless network as barred and camping another cell.

The details of one or more examples of implementations are set forth in the accompanying drawings and the description below. Other features will be apparent from the description and drawings, and from the claims.

BRIEF DESCRIPTION OF THE DRAWINGS

FIG. 2 is a block diagram of a base station configured to execute random access and provide system information to a user device according an example implementation.

FIG. 3 illustrates an example of a communication diagram between the base station and the user device for providing the system information according to an example implementation.

DETAILED DESCRIPTION

Figure 1:
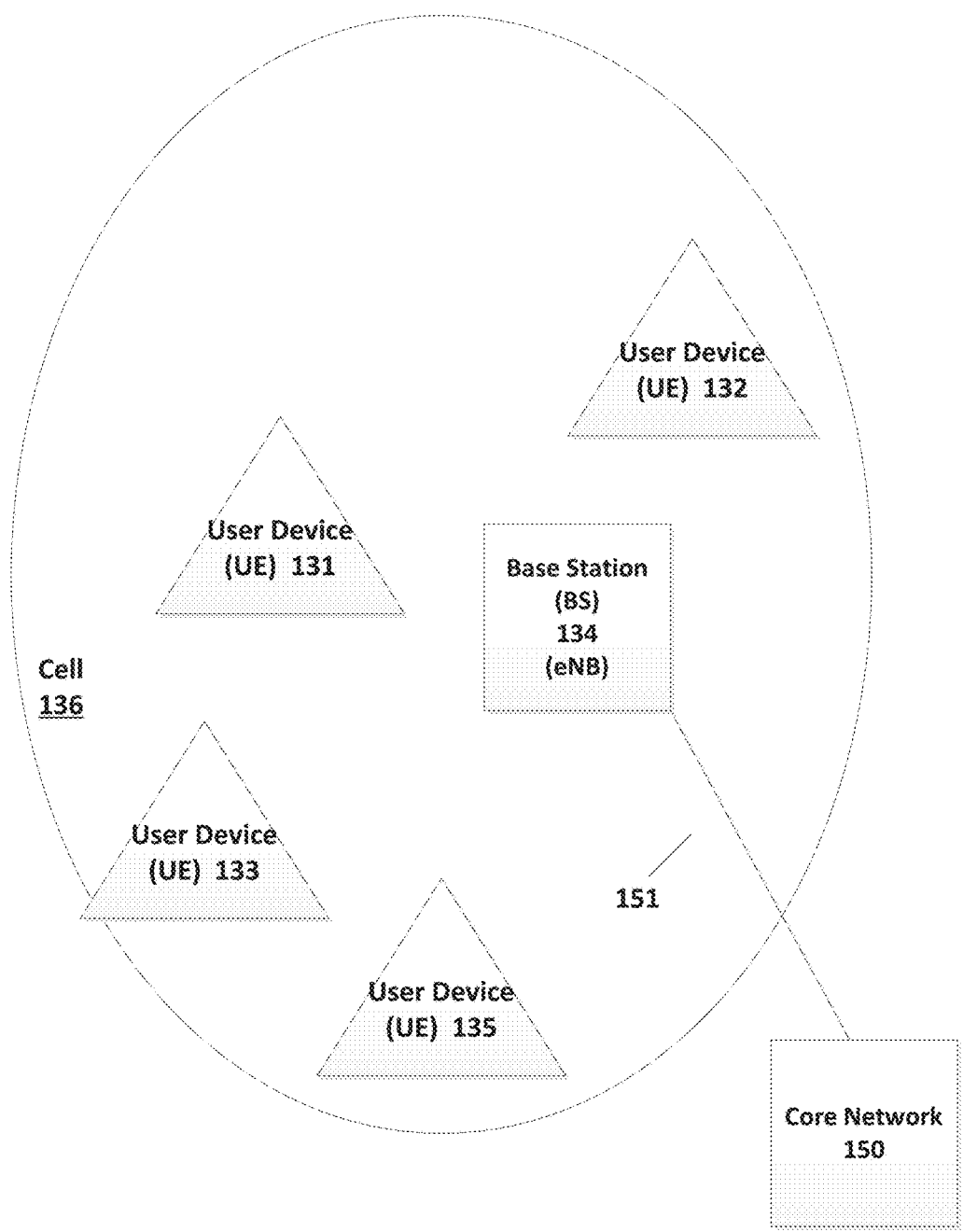
FIG. 1 is a block diagram of a wireless network according to an example implementation.

According to example implementations, the network configures the user devices to back off from sending system information (SI) requests for a certain time duration to prevent the user devices from sending SI requests multiple times before the network plans to provide the SI. For example, when the base stations needs to defer the transmission of requested SI messages, according to the example implementations, the base station communicates an indication of a wait period to the user devices, which indicates to back off (or wait) for a certain time duration, before monitoring the SI window for their requested SI messages or before re-transmitting a new SI request. For instance, the wait period indicates that the requested SI will not be available until after the wait period. Also, upon receipt of the wait period, if the user device determines that the wait period is longer than a threshold amount, the user device may consider the cell as barred, and send a random access (RA) request/SI request to another base station in a different cell.

The base station may determine that there is congestion in the downlink or that high priority information transmission is prioritized over the requested SI message transmission, and, based on that determination, the base station may configure the wait period for all SI messages, for a group of SI messages, or SI message specific. In some examples, the base station determines a time duration for the user devices to wait for the delayed SI messages, and includes that time duration in the indication of the wait period. The time duration may be expressed in a unit of time (e.g., milliseconds) or as a function of SI periodicities. In some examples, the indication of the wait period includes an index value, and the user device determines the time duration of the wait period based on a wait time table (or tables) specified in the specification and the index value. For example, index 1 may correspond to a wait period of x milliseconds. Knowing the wait time table and the index value, the user device can fetch the time duration for the wait period. In some examples, the indication of the wait period includes one bit indicating the user device to wait, and the time duration may be indicated by the minimum SI broadcasted by the base station.

The SI requested by the user devices may be considered on-demand SI (since it is available upon a SI request made by the user device). The on-demand SI may consist of a wide variety of information such as inter frequency selection (or re-selection) parameters, multimedia broadcast/multicast service (MBMS) parameters, positioning information, and/or configuration information for emergency/public warning systems, for example. Also, the SI may include minimum SI, which is periodically broadcasted by the base station. The minimum SI may include parameters for initial access such as RA parameters and scheduling information for the remaining system information block (SIB) types such as SI periodicity, and SI window information. The network may decide which SI is made available for on-demand provisioning and which SI is made available for periodic broadcasting.

Before the user device sends an SI request, the user device determines whether the SI that is required by the user device is available in the area and whether the SI is broadcasted or not. For instance, the scheduling information in the minimum SI may include an indicator that indicates whether the concerned SI block is periodically broadcasted or provided on-demand. If the minimum SI indicates that the SI block is not broadcasted, then the user device does not assume that this SI block is periodically broadcasted in its SI window at every SI periodicity. Therefore, the user device may send an SI request to obtain this SI block.

In order to obtain on-demand SI (e.g., SI that is not made available during periodic broadcasting), a user device may send a RA based SI request for one or more SI messages (each SI message containing a different set of SIBs). In some examples, the RA based SI request is a request for one SI message. In some examples, the RA based SI request is a request for more than one SI messages.

In some examples, the RA based SI request is a message 1 request (MSG1-based SI request). For example, during an RA procedure, the user device sends a random access channel (RACH) preamble message (MSG1) having an embedded SI request. In some examples, one RACH preamble can be used to request multiple SI messages. In response, the user device receives an ACK RACH response that includes an indication of the wait period. The ACK RACH response is an ACK to confirm receipt of the RACH preamble message. The ACK RACH response may also include an RACH preamble identifier (e.g., an identifier corresponding to the preamble sequence to confirm that this response corresponds to the RA preamble/request), but may not include other typical RACH parameters such as uplink (UL) grant (e.g., a grant resource for UL transmission by the user device), CRNTI (e.g., assignment of cell radio network temporary identifier), TAI (e.g., timing advance for the user device to use for the UL transmission), and/or a backoff indicator. In some examples, if the user device receives a NACK RACH response, the user device may ignore the wait period, and re-transmit its SI request. In another example, if the user device receives a NACK RACH response, the user device may apply the wait period before re-transmitting its SI request if the wait period is indicated in the ACK RACH response (MSG2).

In other examples, the RA based SI request is a message 3 request (MSG3-based SI request). For example, during the RA procedure, the user device sends a normal RACH preamble message (MSG1) (e.g., not including the SI request in the preamble), and receives an RACH response (MSG2) that includes typical RACH parameters such as the UL grant, RA preamble ID, TAI, and CRNTI, etc. Then, the user device sends a message (MSG3) having the SI request. In some examples, the SI request message (MSG3) includes a bit mapped SI message request requesting one or more SI messages. In response, the user device receives an ACK message (MSG4) that includes the indication of the wait period. In some examples, if the user device receives a NACK message, the user device may ignore the wait period, and re-transmit its SI request. In another example, if the user device receives a NACK message, the user device may apply the wait period before re-transmitting its SI request if the wait period is indicated in the ACK message (MSG 4).

During the wait period, the user device does not monitor the SI window(s), but after the expiration of the wait period, the user device monitors the next SI window with the expectation of receiving the requested SI. In some examples, after the expiration of the wait period, the user device may re-send its SI request (e.g., MSG1-based SI request or MSG3-based SI request). In other examples, upon receipt of the indication of the wait period, the user device may compare the time duration of the wait period to a threshold level, and if the time duration of the wait period is greater than the threshold level, the user device may consider the cell barred, and transmit an RA-based SI request to another base station of a different cell.

In some examples, the base station broadcasts the indication of the wait period in the minimum SI (which also includes the scheduling information). For example, the base station may determine to apply a wait period to all SI requests, a subset of SI requests, or specific types of SI requested by the user devices, and the base station may broadcast the wait period during an SI window. In this case, upon receiving the indication of the wait period, the user device behavior may be the same, e.g., waiting until after the expiration of the wait period to listen for its requested SI, re-transmit the SI request, and/or consider the cell barred and transmit a new SI request to a different cell. In another example, the user device may wait before sending the SI request if a wait period is indicated in Minimum SI that the user device shall check before sending an SI request. That is the user device may refrain from sending the first SI request if the wait period is indicated in Minimum SI. This approach could be useful to cease the user devices from transmitting at all any SI request if the network is unable to deliver the SI before a wait period.

As a result, the use of the wait period for on-demand SI may decrease the amount of congestion on the RACH, may provide a means to control the amount of SI requests made by the user devices, and may provide a more flexible scheduling framework for the on-demand SI messages.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. A user device (or UE) may also include an Internet of Things (IoT) user device/UE, such as for example, a narrowband Internet of Things (NB-IoT) user device/UE.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

FIG. 2 is a block diagram of a BS 134 configured to execute RA 105 and broadcast or signal system information (SI) 111 to enable an UE 131 to access and transmit information over the mobile network according to an example implementation.

In LTE, RA 105 is used for initial access when establishing a radio link (e.g., moving from RRC_IDLE to RRC_CONNECTED), to re-establish a radio link after radio-link failure, for handover when uplink synchronization needs to be established to the new cell, and/or to establish uplink synchronization if uplink or downlink data arrives when the device is in RRC_CONNECTED and the uplink is not synchronized.

According to RA 105, the UE 131 uses a random access channel (RACH) (e.g., an initial uplink access channel) to access the network during set-up time. In some examples, the RA 105 has four main steps. In step one, the UE 131 selects one of 64 available RACH preambles, and transmits the selected RACH preamble (e.g., MSG1), e.g., at the broadcasted RACH window. The man purpose of the preamble transmission is to indicate to the base station 134 the presence of a random-access attempt and to allow the base station 134 to estimate the delay between the base station 134 and the UE 131. The RACH preamble may include a preamble sequence and a cyclic prefix. In step two, the base station 134 transmits an RACH response (e.g., MGS2) on the downlink shared channel (DL-SCH). In some examples, the RACH response may include a UL grant (e.g., a grant resource for UL transmission by the UE 131), CRNTI (e.g., assignment of Cell Radio Network Temporary Identifier), TAI (e.g., timing advance for the UE 131 to use for UL transmission), and potentially a backoff indicator. In step three, the UE 131 sends an RRC connection request message (e.g., MSG3) to the base station 134 using the uplink shared channel (UL-SCH). The RRC connection request message may include the UE identity and a connection establishment cause. In step four, the base station 134 transmits a contention resolution message (e.g., MSG4) to the UE 131 whose message was successfully received in step three. The contention resolution message may include a new CRNTI which will be used for further communication. In some examples, by performing RA 105, the UE 131 may transition from an idle (e.g., an RRC_idle) state with respect to the base station 134, to a connected (e.g., RRC_connected) state with respect to the base station 134, where RRC refers to radio resource control.

The base station 134 is configured to broadcast or signal SI 111 to the UE 131. In LTE, SI 111 is transmitted on the broadcast control (BCCH) logical channel. Generally, BCCH messages are carried on the DL-SCH and transmitted on the physical downlink shared channel (PDSCH). The SI 111 includes a plurality of system information blocks (SIBs). Each SIB includes a set of parameters. For example, SIB1 may include information related to UE cell access and defines the schedules of other SIBs, SIB2 may include radio resource configuration information common for all UEs, SIB3 may include intra-frequency, inter-frequency, and/or inter-RAT cell re-selection, SIB4 may include intra-frequency neighboring cell information for intra-LTE intra-frequency cell reselection, and SIB5 may include neighbor cell related information for intra-LTE inter-frequency cell-reselection. However, these types of SIBs are merely examples, and the set of SIBs may include a wide variety of parameters.

A particular SI message broadcasted by the base station 134 may include one or more SIBs. A different SI message carries a different set of SIBs. SI messages may be broadcasted during SI windows, e.g., separate SI windows for SI messages, and each window has a periodicity that can be configured. In one example, the base station 134 may periodically broadcast SI message having SIB1 (every 80 ms for example).

FIG. 3 illustrates an example of a communication diagram between the base station 134 and the UE 131 for transmitting the SI 111. In some examples, the SI 111 includes minimum SI 113, and other SI 115. In some examples, the minimum SI 113 may include parameters required for initial access to the cell 136, RA parameters, scheduling information for SI 111 broadcasted periodically or provisioned on-demand, SI window length, SI periodicity, and SIB type. In some examples, the other SI 115 can be periodically broadcasted or acquired on-demand. When the other SI 115 is acquired on-demand, in some examples, it may be referred to as on-demand SI. The other SI 115 may include inter frequency selection (or re-selection) parameters, multimedia broadcast/multicast service (MBMS) parameters, positioning information, and/or configuration information for emergency/public warning systems.

In operation 302, the base station 134 may periodically broadcast the minimum SI 113 to the UE 131. In operation 304, the base station 134 may broadcast periodically (and optionally) one or more SI parameters of the other SI 115 to the UE 131. In operation 306, the UE 131 may transmit an SI request, and, in response to the SI request, the base station 134 may broadcast one or more SI parameters of the other SI 115 (on-demand SI) or transmit the on-demand SI via dedicated signalling. The UE 131 in RRC_IDLE or RRC_INACTIVE transmits an SI request for the on-demand SI without requiring a state transition. For the UE 131 in RRC_CONNECTED, dedicated RRC signalling can be used for the request and delivery of the on-demand SI. It is network decision whether the other SI 115 is broadcast or delivered through dedicated UE specific RRC signalling. In some examples, in order to obtain the on-demand SI (e.g., SI that is not made available during periodic broadcasting), the UE 131 may send a RA based SI request for one or more SI messages. In some examples, the RA based SI request is a request for one SI message. In some examples, the RA based SI request is a request for more than one SI messages.

Figure 4:
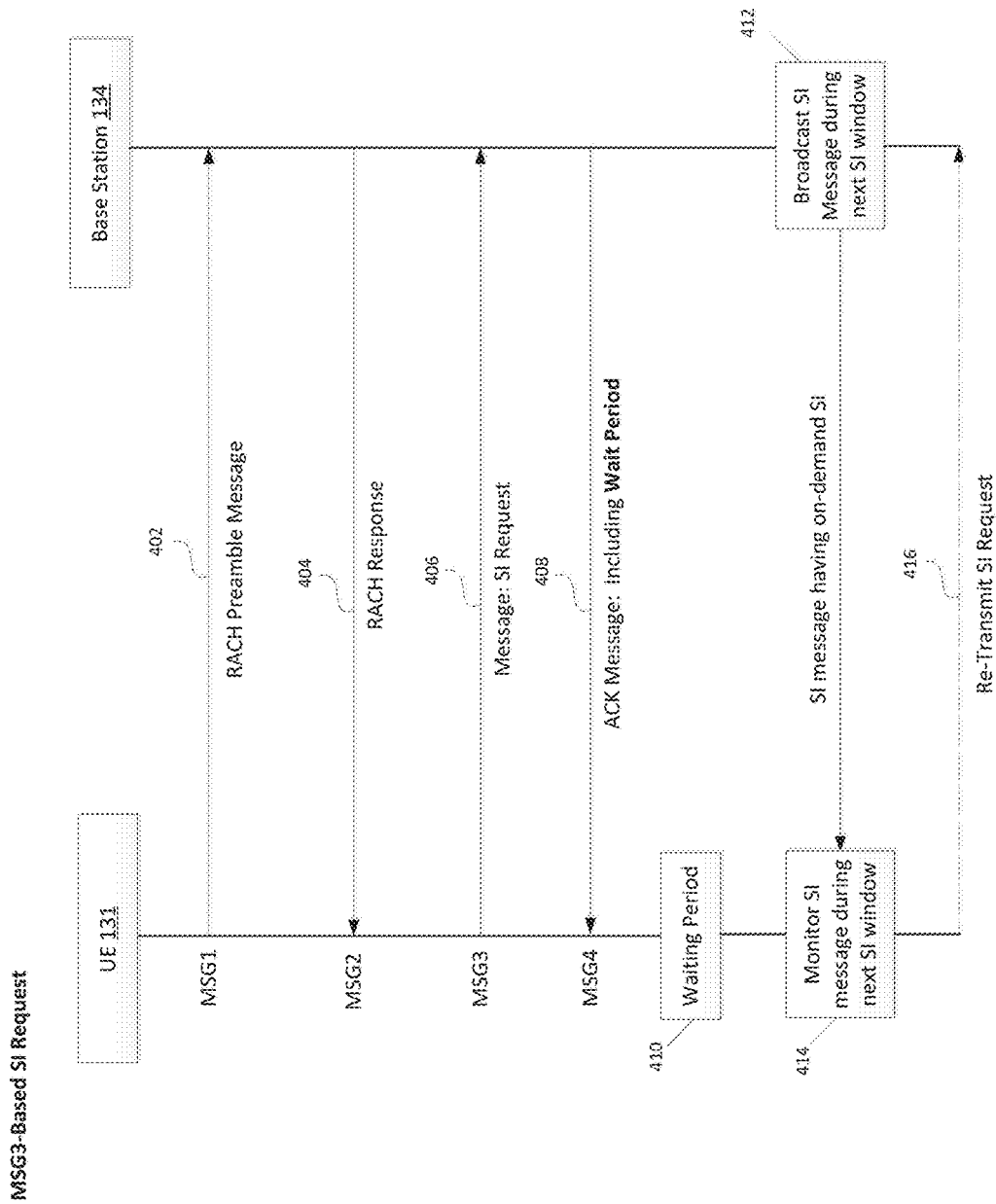
FIG. 4 illustrates an example of a communication diagram between the base station and the user device that uses a wait period for MSG3-based system information requests according to an example implementation.

FIG. 4 illustrates an example of a communication diagram between the base station 134 and the UE 131 that uses a wait period for RA MSG3-based SI requests according to an example implementation.

During the RA 105, in operation 402, the UE 131 sends a normal RACH preamble message (MSG1), and, in operation 404, receives an RACH response (MSG2) that includes typical RACH parameters such as UL grant, RA preamble ID, TAI, and CRNTI, and a potential backoff indicator, etc. Then, in operation 406, the UE 131 sends a message (MSG3) having an embedded SI request. In some examples, the SI request message (MSG3) includes a bit mapped SI message request requesting one or more SI messages. In response, in operation 408, the UE 131 receives an ACK message (MSG4) that includes the indication of the wait period. In some examples, if the UE 131 receives a NACK message, the UE 131 may ignore the wait period, and re-transmit its SI request.

For example, the base station 134 may determine that is unable to provide the requested on-demand SI for a period of time. In particular, the base station 134 may determine that there is congestion on the downlink or that high priority information transmission is prioritized over the requested SI message transmission, and, based on that determination, the base station 134 may configure the wait period for all SI messages, for a group of SI messages, or a particular SI message. In some examples, the base station 134 determines a certain time duration for the UE 131 to wait for the delayed SI message, and includes that time duration in the indication of the wait period. In some examples, the time duration is expressed as an explicit unit of time (e.g., wait x milliseconds) or a function of SI periodicities (e.g., wait X SI windows).

In some examples, the indication of the wait period may include an SI-request backoff indicator in the ACK message. In some examples, the SI-request backoff indicator is an index value. The UE 131 may obtain the time duration (expressed as an explicit unit of time or as a function of SI periodicities) corresponding to the SI-request backoff indicator. For example, the UE 131 may define or have access to a wait time table defined in the specification. The wait time table may include a set of different time durations, where each time duration corresponds to a different index value. Then, based on the wait time table and the SI-request backoff indicator, the UE 131 may obtain the appropriate time duration for the wait period. In some examples, the indication of the wait period may include only one bit informing the UE 131 to backoff from sending an SI request during the wait period. In this example, the backoff configuration could be defined in the specification. For example, upon receiving the backoff bit, the UE 131 may automatically determine the time duration from the specification (e.g., upon receiving the backoff bit, wait x milliseconds or wait a full scheduling period before attempting to re-request). In other examples, the base station 134 may broadcast the time duration for the wait period within the minimum SI 113, and when the UE 131 receives the backoff bit (e.g., in the ACK message), the UE 131 waits for the amount of time broadcasted by the base station 134.

If the wait period was not communicated to the UE 131 (but the transmission of the requested SI message was delayed), the UE 131 may attempt to re-transmit its RA-based SI request, which may cause the RACH to be loaded. However, with the delivery of the wait period, the UE 131 may back off from repeating its SI request. During the wait period, in operation 410, the UE 131 may not listen or monitor the SI window for their requested SI message(s). Also, during the wait period, in operation 410, the UE 131 would not attempt to repeat its SI request.

In some examples, after the expiration of the wait period, in operation 412, the base station 134 broadcasts the SI message specific to the UE's request during its next scheduled SI window. For example, SI messages are broadcasted during SI windows, e.g., separate SI windows for SI messages, and each window has a periodicity that can be configured. In operation 414, the UE 131 may monitor the SI window to obtain the requested on-demand SI. In some examples, after the expiration of the wait period, in operation 416, the UE 131 may re-send its SI request (e.g., MSG3-based SI request). In other examples, upon receipt of the indication of the wait period, the UE 131 may compare the duration of the wait period to a threshold level, and if the time duration of the wait period is greater than the threshold level, the UE 131 may consider the cell barred, and transmit an RA-based SI request to another base station of a different cell.

As indicated above, the RACH response may include a backoff indicator, which is different than the wait period for SI requests. For example, if a relatively large amount of UEs are attempting to access wireless media at the same time, e.g., the RACH, then it can cause collisions, so the backoff indicator may be used to decrease collisions/interference on the RACH. The RACH response's backoff time is applied only if the RACH response is considered not successful, which occurs if none of the received RACH responses contain a Random Access Preamble identifier (RAPID) corresponding to the transmitted RA preamble. As such, this backoff indicator cannot be applied by the UEs that have successfully received a RACH response. In this case, the UEs that have received an ACK in the RACH response will attempt to decode the SI message in the next SI window, and if the SI message is not delivered, the UEs will re-send new SI requests. As such, the existing backoff indicator may not address the problem of unnecessary repeats of SI requests.

Figure 5:
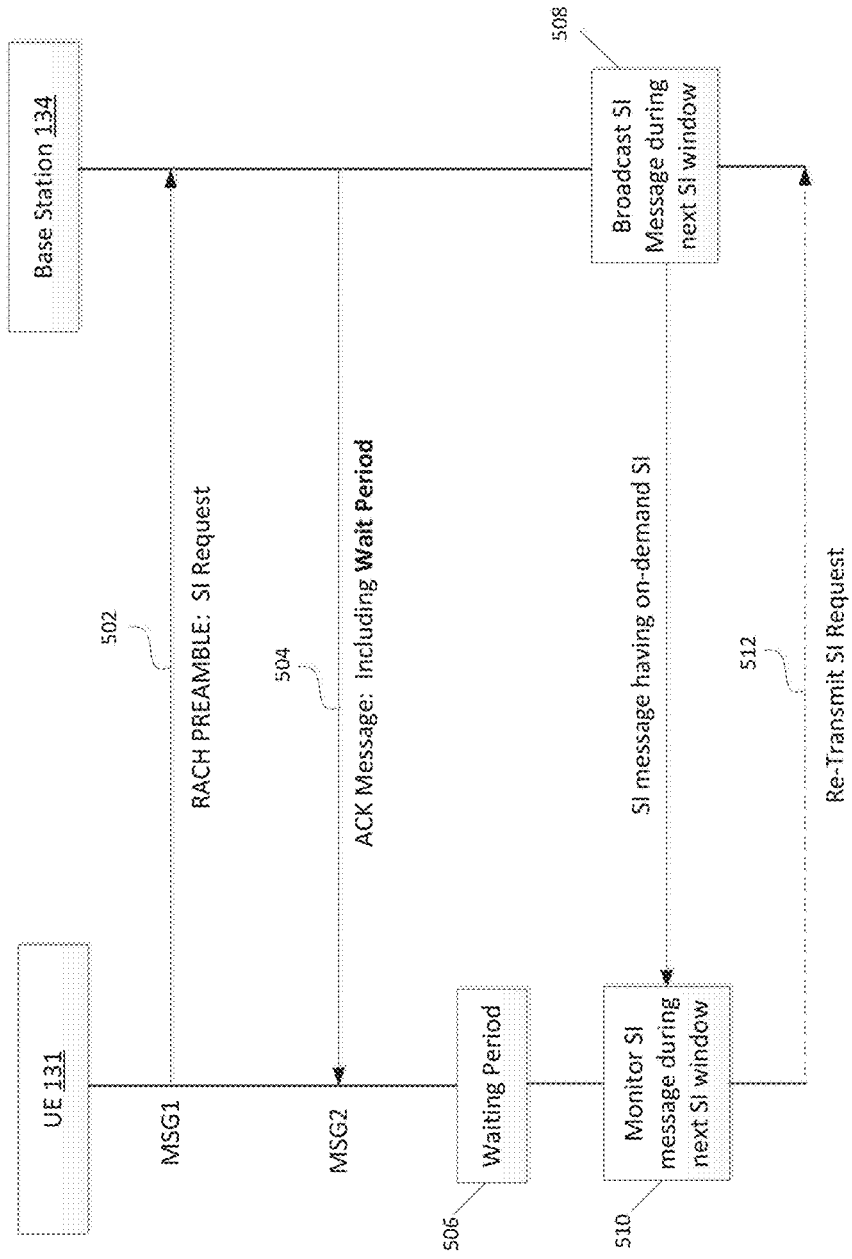
FIG. 5 illustrates an example of a communication diagram between the base station and the user device that uses a wait period for MSG1-based system information requests according to an example implementation.

FIG. 5 illustrates an example of a communication diagram between the base station 134 and the UE 131 that uses a wait period for MSG1-based SI requests according to an example implementation.

For example, during the RA 105, in operation 502, the UE 131 selects a dedicated RACH preamble for SI request, and sends the selected RACH preamble having an embedded SI request. In some example, each RACH preamble is associated with a different SIB. In some examples, one RACH preamble can be used to request multiple SI messages. In operation 504, the UE 131 receives an ACK RACH response that includes the indication of the wait time. The ACK RACH response is an ACK to confirm receipt of the RACH preamble message. The ACK RACH response may also include an RACH preamble identifier (e.g., an identifier corresponding to the preamble sequence to confirm that this response corresponds to the RA preamble/request), but may not include other typical RACH parameters such as the UL grant, the CRNTI, the TAI, the backoff indicator, etc. In some examples, if the UE 131 receives a NACK RACH response, the UE 131 may ignore the wait period, and re-transmit the MSG1-based SI request.

Similar to the example implementation of FIG. 4, the indication of the wait period may be expressed in one of a plurality of different options as previously explained. For example, the indication of the wait period in the RACH response may include the time duration of the wait period (e.g., in a unit of time or as a function of SI SI periodicities), an index value in which the corresponding time duration is specified in the wait time table accessible by the UE 131, or the one bit backoff indicator.

In operation 506, during the wait period, the UE 131 may not listen or monitor the SI window for their requested SI message(s). Also, during the wait period, in operation 410, the UE 131 would not attempt to repeat its SI request. In some examples, after the expiration of the wait period, in operation 508, the base station 134 broadcasts the SI message specific to the UE's request during the next SI window. In operation 510, the UE 131 may monitor the SI window to obtain the requested on-demand SI. In some examples, after the expiration of the wait period, in operation 512, the UE 131 may re-send its SI request (e.g., MSG1-based SI request). In other examples, upon receipt of the indication of the wait period, the UE 131 may compare the duration of the wait period to a threshold level, and if the time duration of the wait period is greater than the threshold level, the UE 131 may consider the cell barred, and transmit an RA-based SI request to another base station of a different cell.

Figure 6:
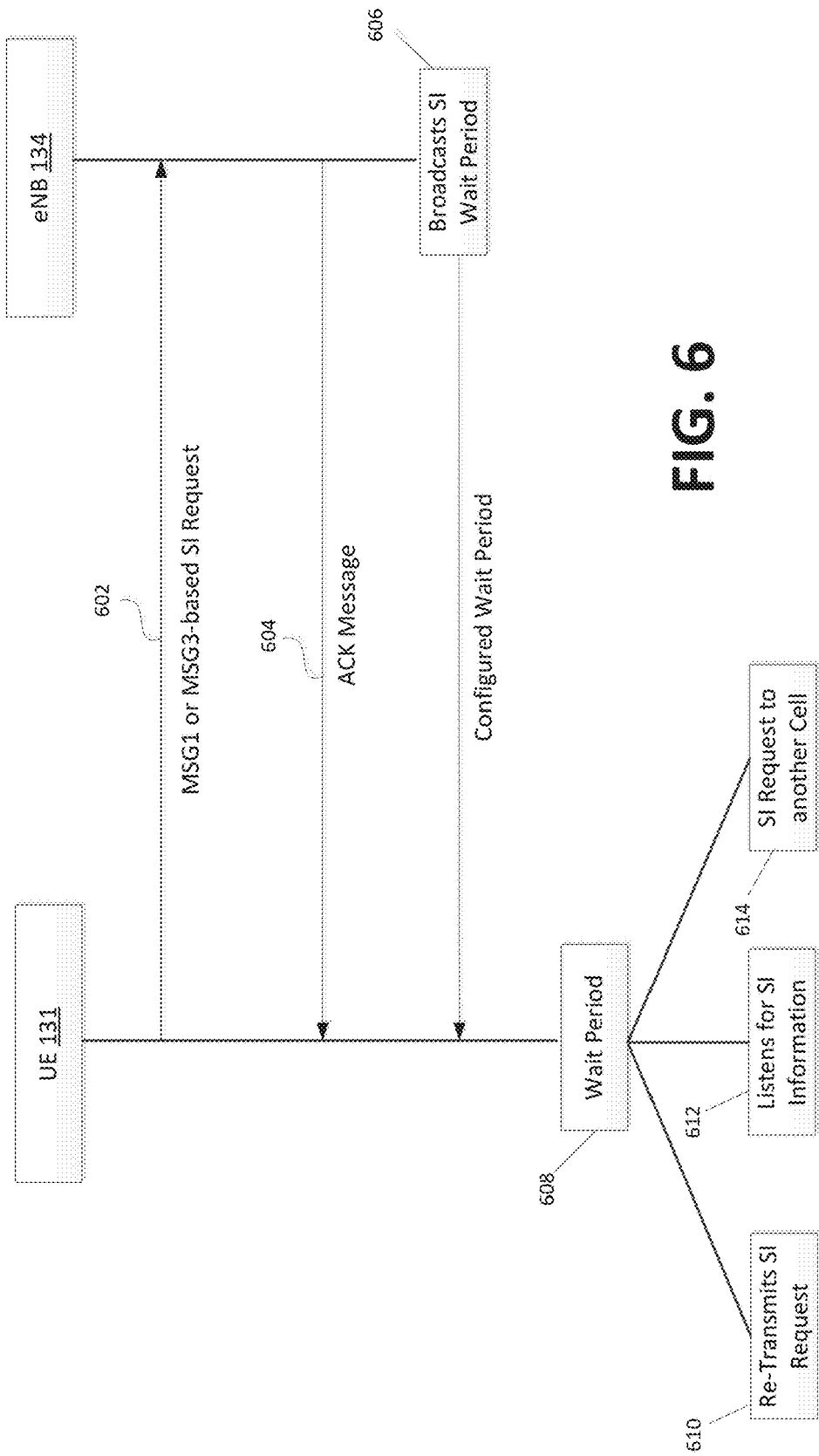
FIG. 6 illustrates an example of a communication diagram between the base station and the user device that uses a wait period for MSG1-based or MS3-based system information requests according to an example implementation.

FIG. 6 illustrates an example of a communication diagram between the base station 134 and the UE 131 that uses a wait period for MSG1-based or MS3-based SI requests according to an example implementation.

In operation 602, the UE 131 transmits an MSG1 or MSG3-based SI request (as previously explained with reference to FIGS. 4-5). In operation 604, the UE 131 may receive an ACK message that acknowledges receipt of the SI request. In operation 606, instead of providing the indication of the wait period in the ACK message, the base station 134 may broadcast the indication of the wait period during the broadcasting of the minimum SI 113. The base station 134 may determine to apply a wait period to all SI requests, a subset of SI requests, or specific types of SI requested by the UEs 131, and the base station 134 may broadcast the wait period during an SI window. In this case, upon receiving the indication of the wait period, the UE's behavior may be the same, e.g., waiting until after the expiration of the wait period to listen for its requested SI (operation 612), re-transmit the SI request (operation 610), or consider the cell barred and transmit a new SI request to a different cell (operation 614).

Figure 7:
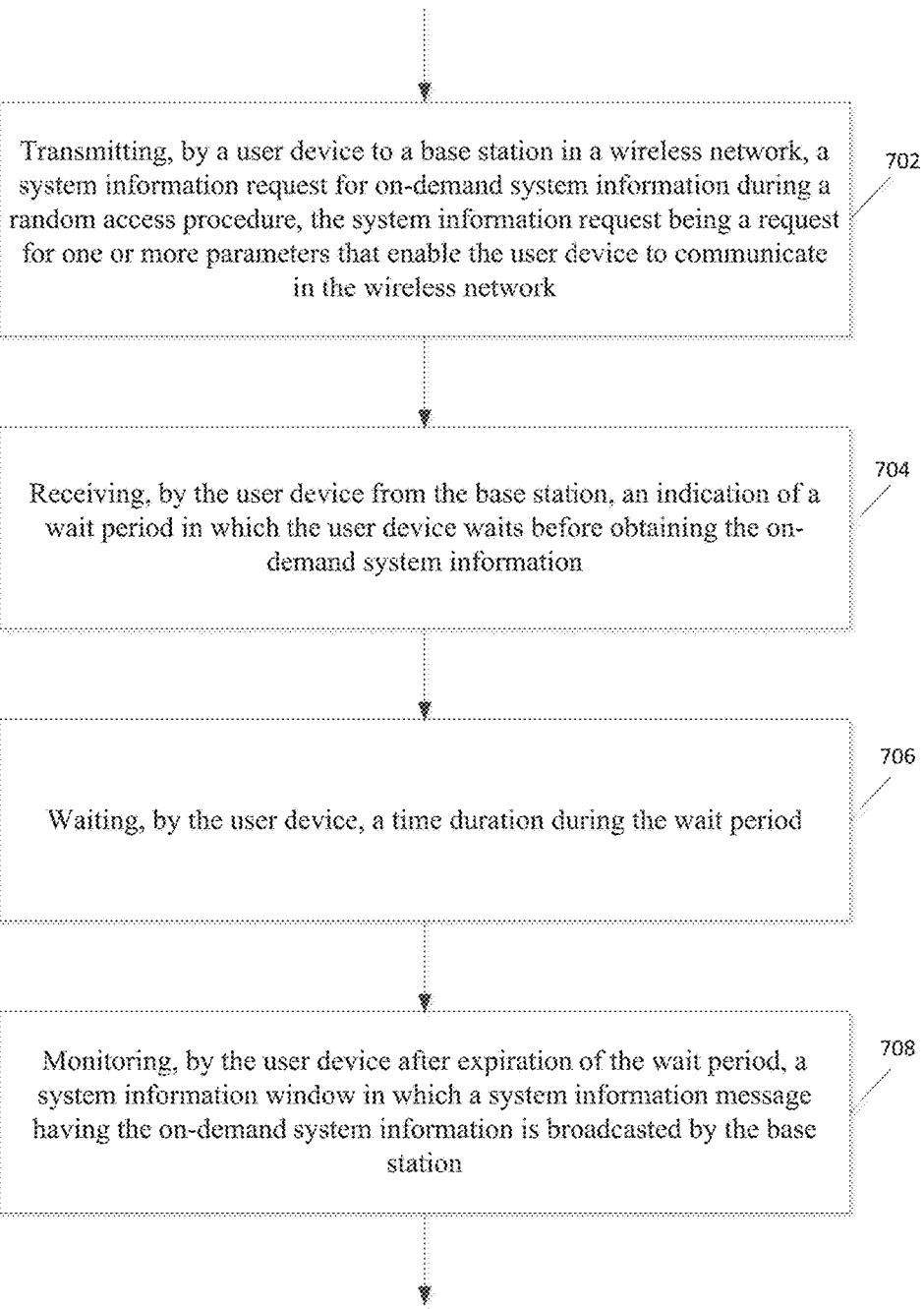
FIG. 7 is a flow chart illustrating operations of the user device according to an example implementation.

FIG. 7 is a flow chart 700 illustrating operation of a user device/user equipment (UE) according to an example implementation.

Operation 702 includes transmitting, by a user device to a base station in a wireless network, a system information request for on-demand system information during a random access procedure, where the system information request is a request for one or more parameters that enable the user device to communicate in the wireless network. Operation 704 includes receiving, by the user device from the base station, an indication of a wait period in which the user device waits before obtaining the on-demand system information. Operation 706 includes waiting, by the user device, a time duration during the wait period. Operation 708 includes monitoring, by the user device after expiration of the wait period, a system information window in which a system information message having the on-demand system information is broadcasted by the base station.

According to an example implementation of the method of FIG. 7, the system information request is included within a random access preamble message.

According to an example implementation of the method of FIG. 7, the method may further include transmitting, by the user device to the base station, a random access preamble message, receiving, by the user device from the base station, a random access response, and transmitting, by the user device to the base station, a message in response to the random access response, where the message includes the system information request.

According to an example implementation of the method of FIG. 7, the indication of the wait period is included with an acknowledgment message in response to the system information request.

According to an example implementation of the method of FIG. 7, the method further includes re-transmitting the system information request after the wait period.

According to an example implementation of the method of FIG. 7, the indication of the wait period includes an index value, and the user device is configured to obtain the time duration for the wait period from a wait time table using the index value.

According to an example implementation of the method of FIG. 7, the method further includes comparing the time duration of the wait period to a threshold level, and transmitting, from the user device to a different base station in a different cell, a new system information request in response to the time duration of the wait period being above the threshold level.

According to an example implementation of the method of FIG. 7, the time duration is included in the indication of the wait period, where the time duration is expressed in a unit of time or as a function of system information periodicities.

According to another example implementation, an apparatus may include at least one processor and at least one memory including computer instructions, when executed by the at least one processor, cause the apparatus to transmit, by a user device to a base station in a wireless network, a system information request for on-demand system information during a random access procedure, where the system information request is a request for one or more parameters that enable the user device to communicate in the wireless network, receive, by the user device from the base station, an indication of a wait period in which the user device waits before obtaining the on-demand system information, wait, by the user device, a time duration during the wait period, and monitor, by the user device after expiration of the wait period, a system information window in which a system information message having the on-demand system information is broadcasted by the base station.

According to an example implementation, the indication of the wait period corresponds to a plurality of SI messages such that the plurality of SI messages are delayed by the time duration of the wait period.

According to an example implementation, the computer instructions, when executed by the at least one processor, cause the apparatus to transmit, by the user device to the base station, a random access preamble message, receive, by the user device from the base station, a random access response, and transmit, by the user device to the base station, a message in response to the random access response, where the message includes the system information request.

According to an example implementation, the indication of the wait period is included with an acknowledgment message in response to the system information request.

According to an example implementation, the computer instructions, when executed by the at least one processor, cause the apparatus to re-transmitting the system information request after the wait period.

According to an example implementation, the computer instructions, when executed by the at least one processor, cause the apparatus to compare the time duration of the wait period to a threshold level, and transmit, by the user device to a different base station in a different cell, a new system information request in response to the time duration of the wait period being above the threshold level.

According to an example implementation, the indication of the wait period includes a bit indicating the user device to wait, and the time duration of the wait period is indicated by minimum system information broadcasted by the base station a time duration in which the user device waits before re-attempting the system information request.

According to an example implementation, the indication of the wait period is included within minimum system information broadcasted by the base station, and the user device waits the time duration of the wait period before transmitting the system information request to the base station.

According to an example implementation, the indication of the wait period is included within a random access channel (RACH) response.

Figure 8:
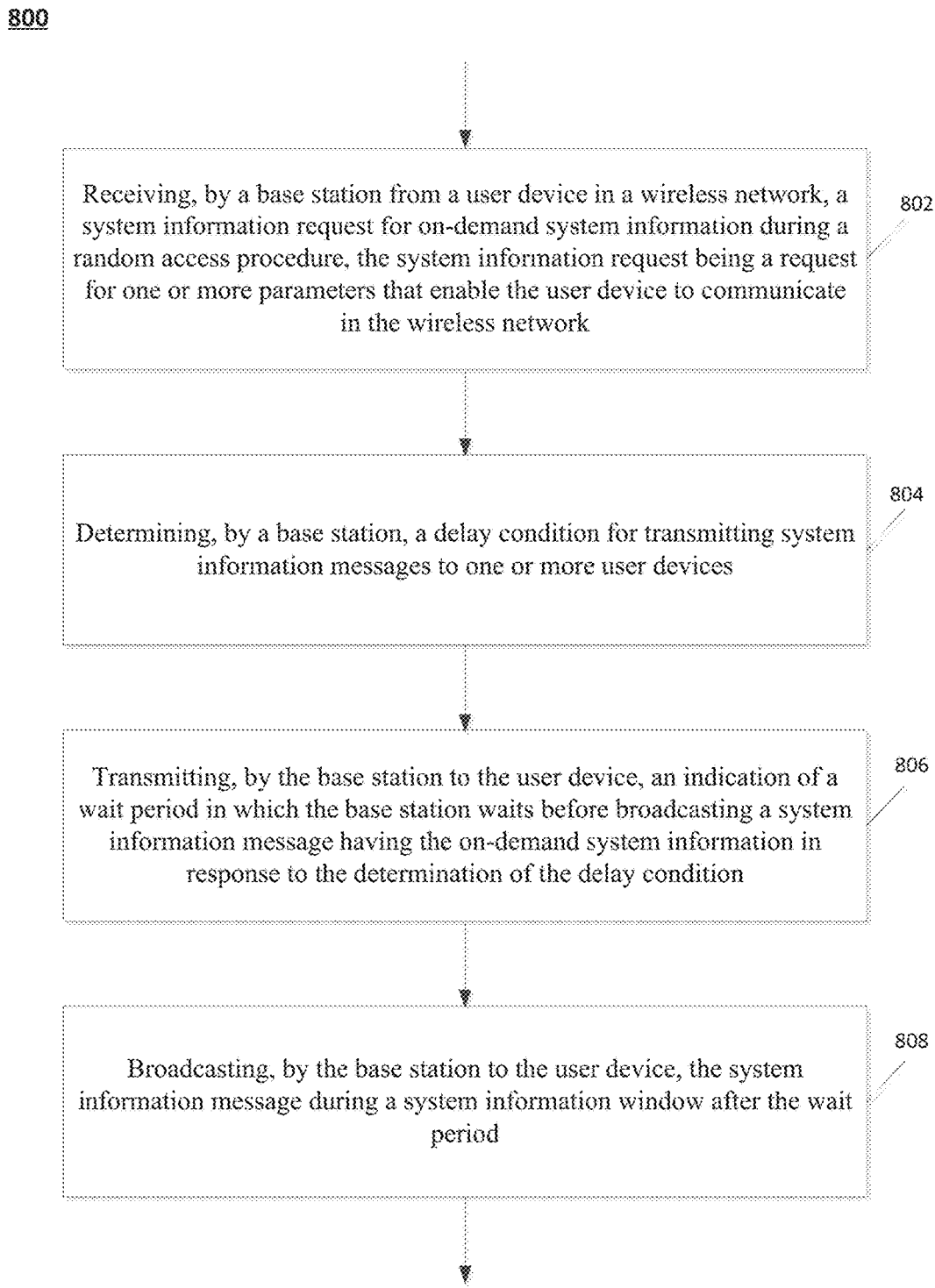
FIG. 8 is as flow chart illustrating operations of the base station according to an example implementation.

FIG. 8 is as flow chart 800 illustrating operation of a base station (BS)/eNB according to an example implementation.

Operation 802 includes receiving, by a base station from a user device in a wireless network, a system information request for on-demand system information during a random access procedure, where the system information request is a request for one or more parameters that enable the user device to communicate in the wireless network. Operation 804 includes determining, by a base station, a delay condition for transmitting system information messages to one or more user devices. Operation 806 includes transmitting, by the base station to the user device, an indication of a wait period in which the base station waits before broadcasting a system information message having the on-demand system information in response to the determination of the delay condition. Operation 808 includes broadcasting, by the base station to the user device, the system information message during a system information window after the wait period.

According to an example implementation of the method of FIG. 8, the system information request is included within a random access preamble message, and the indication of the wait period is included within an acknowledgment of the random access preamble message.

According to an example implementation of the method of FIG. 8, the method includes receiving, by the base station from the user device, a random access preamble message, transmitting, by the base station to the user device, a random access response, and receiving, by the base station from the user device, a message in response to the random access response, where the message includes the system information request, and the indication of the wait period is included within an acknowledgement of the message.

According to an example implementation of the method of FIG. 8, the method includes periodically broadcasting, by the base station, minimum system information during a system information window, where the minimum system information includes the indication of the wait period.

Figure 9:
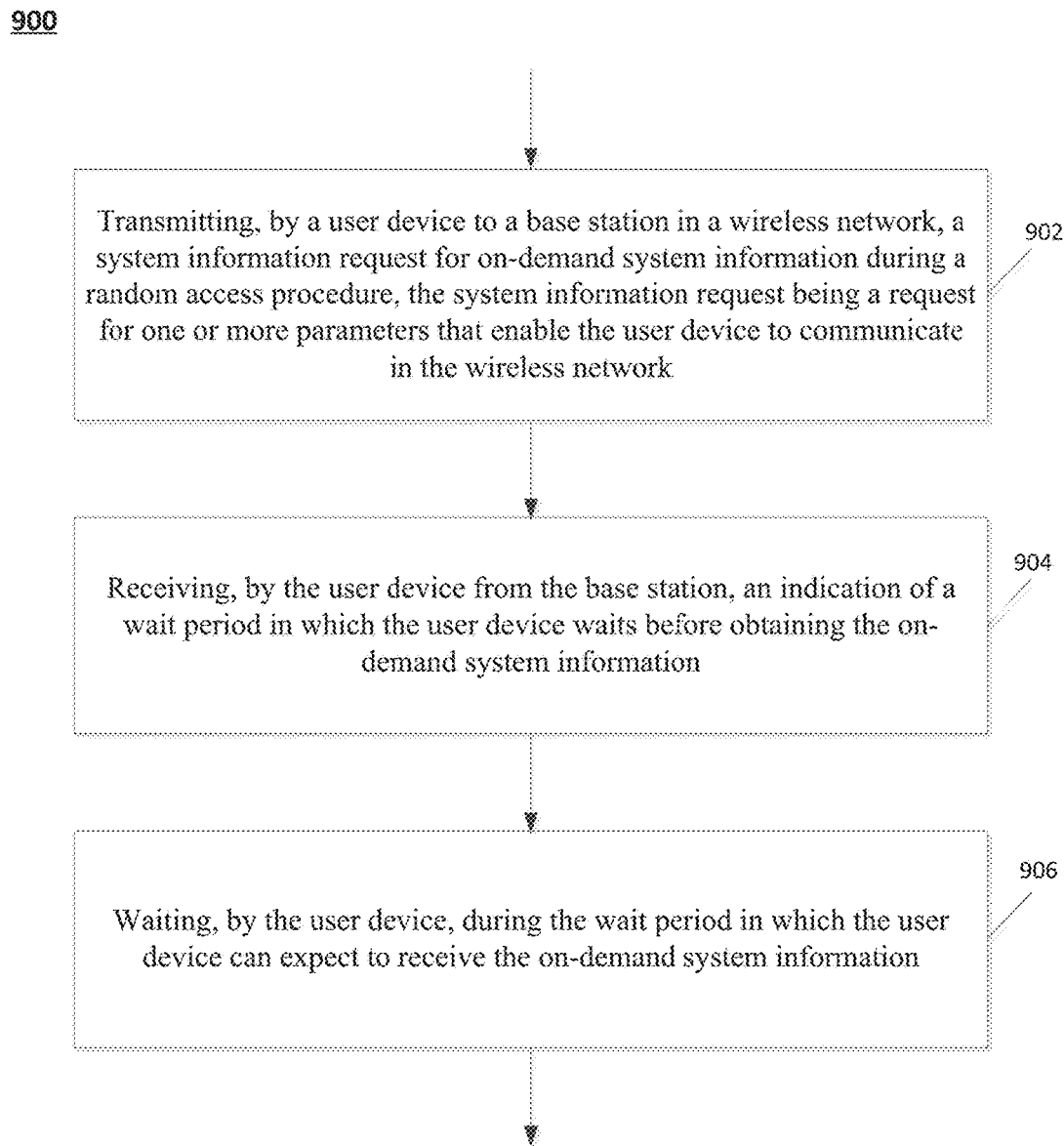
FIG. 9 is a flow chart illustrating operations of a user device according to an example implementation.

FIG. 9 is a flow chart 900 illustrating operation of a user device/user equipment (UE) according to an example implementation.

Operation 902 includes transmitting, by a user device to a base station in a wireless network, a system information request for on-demand system information during a random access procedure, where the system information request is a request for one or more parameters that enable the user device to communicate in the wireless network. Operation 904 includes receiving, by the user device from the base station, an indication of a wait period in which the user device waits before obtaining the on-demand system information. Operation 906 includes waiting, by the user device, during the wait period in which the user device can expect to receive the on-demand system information. In this implementation, the user device may receive the indication of the wait period (according to one or more of the above described examples), and during the wait period, the user device may expect to receive the on-demand system information from the base station. For example, in this implementation, the wait period is a time duration in which the base station is configured to delivery the on-demand system information.

According to an example implementation of the method of FIG. 9, the method may include retransmitting, by the user device to the base station after the wait period, the system information request during the random access procedure.

According to an example implementation of the method of FIG. 9, the system information request may be included within a random access preamble message.

According to an example implementation of the method of FIG. 9, the method may further include transmitting, by the user device to the base station, a random access preamble message, receiving, by the user device from the base station, a random access response, and transmitting, by the user device to the base station, a message in response to the random access response, the message including the system information request.

According to an example implementation of the method of FIG. 9, the indication of the wait period may be included with an acknowledgment message in response to the system information request.

According to an example implementation of the method of FIG. 9, the indication of the wait period may be included within minimum system information broadcasted by the base station.

According to an example implementation of the method of FIG. 9, the indication of the wait period may be included within a random access channel (RACH) response.

According to an example implementation of the method of FIG. 9, the indication of the wait period may include an index value, and the user device may be configured to obtain the time duration for the wait period from a wait time table using the index value.

According to an example implementation of the method of FIG. 9, the indication of the wait period may include a time duration expressed as a function of system information periodicities.

According to an example implementation, an apparatus comprising at least one processor and at least one memory including computer instructions, when executed by the at least one processor, cause the apparatus to execute the method of FIG. 9 (and/or one or more operations/features discussed herein).

According to an example implementation, a computer program product comprising a computer-readable storage medium and storing executable code that, when executed by at least one processor, is configured to cause the at least one processor to execute the method of FIG. 9 (and/or one or more operations/features discussed herein).

Figure 10:
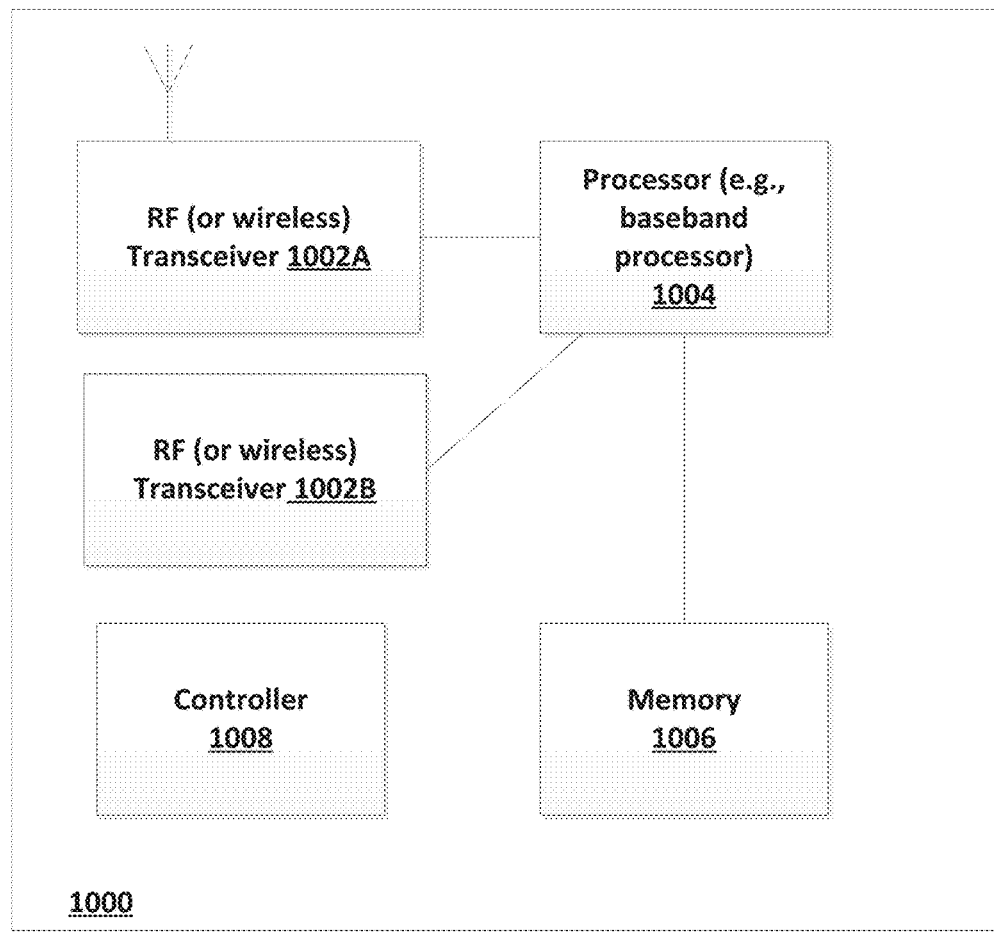
FIG. 10 is a block diagram of a wireless station according to an example implementation.

FIG. 10 is a block diagram of a wireless station (e.g., AP or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002A or 1002B. Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above (e.g., any of the operations of the timing diagrams and flowcharts of the figures). Processor 1004 may be (or may include), for example, hardware, programmable logic, a programmable processor that executes software or firmware, and/or any combination of these. The processor 1004 may include one or more processors coupled to a substrate. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor (e.g., a processor coupled to a substrate), a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors (e.g., one or more processors coupled to a substrate) executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  transmitting, by a user device to a base station in a wireless network, a system information request for on-demand system information during a random access procedure, the system information request being a request for one or more parameters that enable the user device to communicate in the wireless network;

receiving, by the user device from the base station, an indication of a wait period in which the user device waits before obtaining the on-demand system information;

waiting, by the user device, a time duration during the wait period; and monitoring, by the user device after expiration of the wait period, a system information window in which a system information message having the on-demand system information is broadcasted by the base station.

2. The method of claim 1, wherein the system information request is included within a random access preamble message.

3. The method of claim 1, further comprising:

transmitting, by the user device to the base station, a random access preamble message;

receiving, by the user device from the base station, a random access response; and transmitting, by the user device to the base station, a message in response to the random access response, the message including the system information request.

4. The method of claim 1, wherein the indication of the wait period is included with an acknowledgment message in response to the system information request.

5. The method of claim 1, further comprising:

re-transmitting the system information request after the wait period.

6. The method of claim 1, wherein the indication of the wait period includes an index value, and the user device is configured to obtain the time duration for the wait period from a wait time table using the index value.

7. The method of claim 1, further comprising:

comparing the time duration of the wait period to a threshold level; and transmitting, from the user device to a different base station in a different cell, a new system information request in response to the time duration of the wait period being above the threshold level.

8. The method of claim 1, wherein the time duration is included in the indication of the wait period, the time duration being expressed in a unit of time or as a function of system information periodicities.

9. An apparatus comprising at least one processor and at least one memory including computer instructions, when executed by the at least one processor, cause the apparatus to:

transmit, by a user device to a base station in a wireless network, a system information request for on-demand system information during a random access procedure, the system information request being a request for one or more parameters that enable the user device to communicate in the wireless network;

receive, by the user device from the base station, an indication of a wait period in which the user device waits before obtaining the on-demand system information;

wait, by the user device, a time duration during the wait period; and monitor, by the user device after expiration of the wait period, a system information window in which a system information message having the on-demand system information is broadcasted by the base station.

10. The apparatus of claim 9, wherein the indication of the wait period corresponds to a plurality of SI messages such that the plurality of SI messages are delayed by the time duration of the wait period.

11. The apparatus of claim 9, wherein the computer instructions, when executed by the at least one processor, cause the apparatus to:

transmit, by the user device to the base station, a random access preamble message;

receive, by the user device from the base station, a random access response; and transmit, by the user device to the base station, a message in response to the random access response, the message including the system information request.

12. The apparatus of claim 9, wherein the indication of the wait period is included with an acknowledgment message in response to the system information request.

13. The apparatus of claim 9, wherein the computer instructions, when executed by the at least one processor, cause the apparatus to:

re-transmitting the system information request after the wait period.

14. The apparatus of claim 9, wherein the indication of the wait period includes a bit indicating the user device to wait, and the time duration of the wait period is indicated by minimum system information broadcasted by the base station.

15. The apparatus of claim 9, wherein the indication of the wait period is included within minimum system information broadcasted by the base station, and the user device waits the time duration of the wait period before transmitting the system information request to the base station.

16. The apparatus of claim 9, wherein the indication of the wait period is included within a random access channel (RACH) response.

17. A computer program product, the computer program product comprising a computer-readable storage medium and storing executable code that, when executed by at least one processor, is configured to cause the at least one processor to:

receive, by a base station from a user device in a wireless network, a system information request for on-demand system information during a random access procedure, the system information request being a request for one or more parameters that enable the user device to communicate in the wireless network;

determine, by a base station, a delay condition for transmitting system information messages to one or more user devices;

transmit, by the base station to the user device, an indication of a wait period in which the base station waits before broadcasting a system information message having the on-demand system information in response to the determination of the delay condition; and broadcast, by the base station to the user device, the system information message during a system information window after the wait period.

18. The computer program product of claim 17, wherein the system information request is included within a random access preamble message, and the indication of the wait period is included within an acknowledgment of the random access preamble message.

19. The computer program product of claim 17, wherein the executable code that, when executed by the at least one processor, is configured to cause the at least one processor to:

receive, by the base station from the user device, a random access preamble message;

transmit, by the base station to the user device, a random access response; and receive, by the base station from the user device, a message in response to the random access response, the message including the system information request,
wherein the indication of the wait period is included within an acknowledgement of the message.

20. The computer program product of claim 17, wherein the executable code that, when executed by the at least one processor, is configured to cause the at least one processor to:
periodically broadcast, by the base station, minimum system information during a system information window, the minimum system information including the indication of the wait period.

21. A method comprising:
transmitting, by a user device to a base station in a wireless network, a system information request for on-demand system information during a random access procedure, the system information request being a request for one or more parameters that enable the user device to communicate in the wireless network;
receiving, by the user device from the base station, an indication of a wait period in which the user device waits before obtaining the on-demand system information; and
waiting, by the user device, during the wait period in which the user device can expect to receive the on-demand system information.

22. The method of claim 21, further comprising:
retransmitting, by the user device to the base station after the wait period, the system information request during the random access procedure.

23. The method of claim 21, wherein the system information request is included within a random access preamble message.

24. The method of claim 21, further comprising:
transmitting, by the user device to the base station, a random access preamble message;
receiving, by the user device from the base station, a random access response; and
transmitting, by the user device to the base station, a message in response to the random access response, the message including the system information request.

25. The method of claim 21, wherein the indication of the wait period is included with an acknowledgment message in response to the system information request.

26. The method of claim 21, wherein the indication of the wait period is included within minimum system information broadcasted by the base station.

27. The method of claim 21, wherein the indication of the wait period is included within a random access channel (RACH) response.

28. The method of claim 21, wherein the indication of the wait period includes an index value, and the user device is configured to obtain the time duration for the wait period from a wait time table using the index value.

29. The method of claim 21, wherein the indication of the wait period includes a time duration expressed as a function of system information periodicities.

30. The method of claim 21, further comprising:
considering, by the user device, a cell of the wireless network as barred and camping another cell.

31. An apparatus comprising at least one processor and at least one memory including computer instructions, when executed by the at least one processor, cause the apparatus to execute the method of claim 21.

32. A computer program product, the computer program product comprising a computer-readable storage medium and storing executable code that, when executed by at least one processor, is configured to cause the at least one processor to execute the method of claim 21.

* * * * *